United States Patent [19]
Saka et al.

[11] Patent Number: 5,760,699
[45] Date of Patent: Jun. 2, 1998

[54] METHOD AND APPARATUS FOR RECEIVING SELECTED PAGING SIGNAL

[75] Inventors: Yoshiaki Saka; Shinichi Idomukai; Isamu Fujii; Yuji Hishiki, all of Chiba, Japan

[73] Assignee: Seiko Instruments, Inc., Chiba, Japan

[21] Appl. No.: 611,662

[22] Filed: Mar. 6, 1996

[51] Int. Cl.⁶ .............. H04B 1/16; H04Q 7/00; H04Q 1/00; G08B 5/22
[52] U.S. Cl. ............ 340/825.21; 340/825.47; 340/825.44; 455/343; 370/311; 370/503; 375/354
[58] Field of Search ............ 340/825.44, 825.47, 340/825.48, 825.2, 825.21; 455/334, 343, 38.1, 31.1; 375/365, 354, 359, 360; 370/311, 503, 509, 512

[56] References Cited

U.S. PATENT DOCUMENTS

| | | | |
|---|---|---|---|
| 4,353,065 | 10/1982 | Mori | 340/825.44 |
| 4,745,408 | 5/1988 | Nagata et al. | 340/825.44 |
| 4,839,639 | 6/1989 | Sato et al. | 340/825.44 |
| 5,227,777 | 7/1993 | Sato et al. | 340/825.44 |
| 5,365,543 | 11/1994 | Takahashi et al. | 375/1 |

*Primary Examiner*—Michael Horabik
*Assistant Examiner*—Yonel Beaulieu
*Attorney, Agent, or Firm*—Loeb & Loeb LLP

[57] ABSTRACT

In a selected paging signal type receiving apparatus, a transmission code is received which is arranged by coupling a series of signal codes including a preamble, a sync code, and a message code. Even when signal reception is interrupted, this receiving apparatus can immediately respond to an interference condition and a completion of a signal transmission. In the case of the interference condition, the receiving apparatus can be immediately recovered to the signal reception operation after the interference condition disappears. This selected paging signal type receiving apparatus with a simple arrangement is arranged by a sync signal generator for generating a signal having the same time period as that of the sync code, and reset when the preamble is detected; a receiving circuit intermittently operated in response to the sync signal from a sync signal generator; a sync code detecting circuit and a preamble detecting circuit intermittently operated in response to this sync code; and also a paging code detecting circuit operated only when the sync code is detected.

16 Claims, 4 Drawing Sheets

RECEIVING OPERATION ON NORMAL RECEIVING STATE

FIG. 3
RECEIVING OPERATION ON ABNORMAL RECEIVING STATE
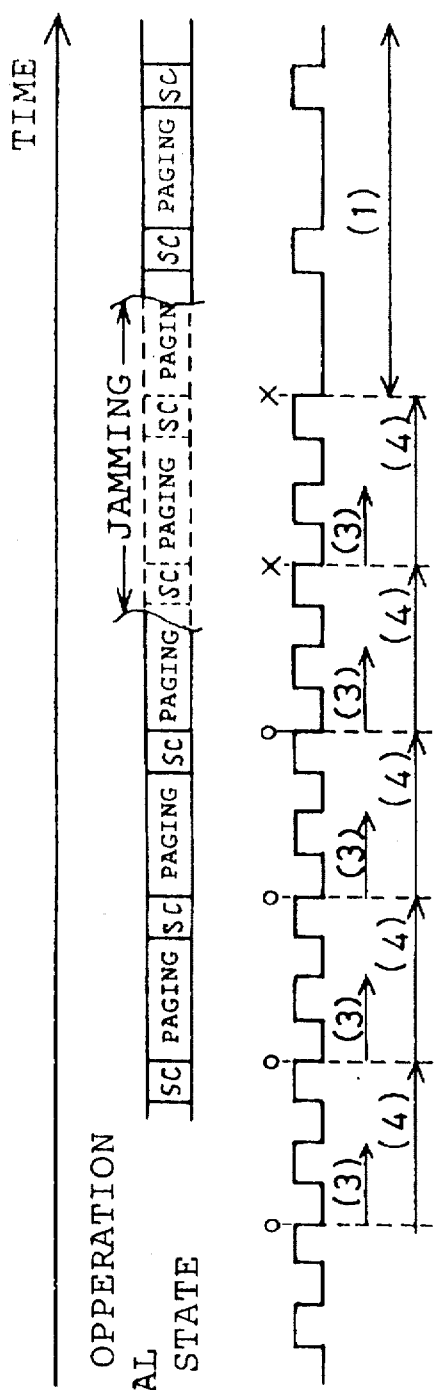
FIG. 3(a) PRIOR ART
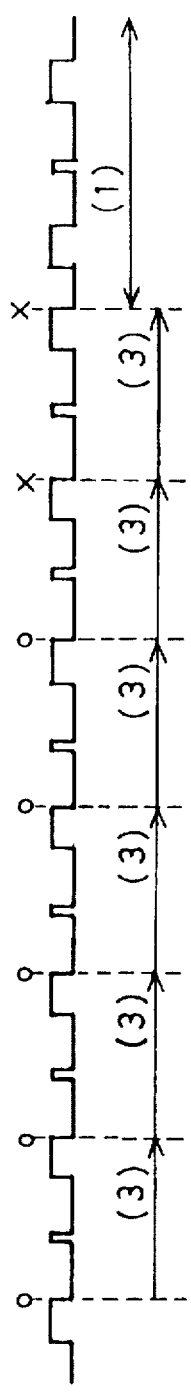
FIG. 3(b) PRIOR ART
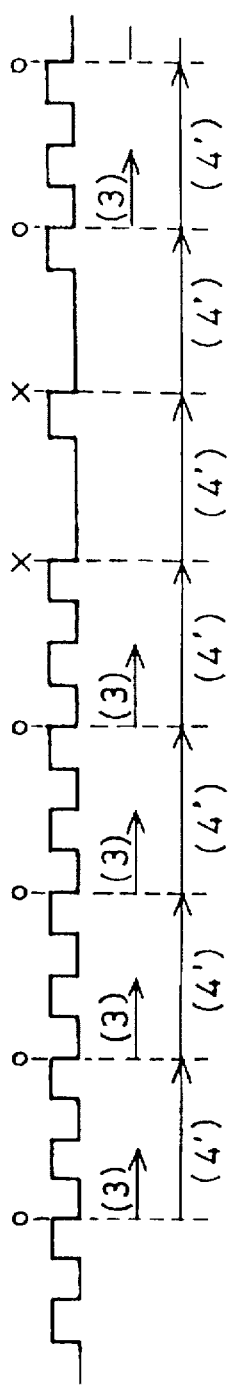
FIG. 3(c)

METHOD AND APPARATUS FOR RECEIVING SELECTED PAGING SIGNAL

BACKGROUND OF THE INVENTION

1. Field of the Invention

The present invention generally relates to a method and an apparatus for receiving a selected paging signal. More specifically, the present invention is directed to a selected paging signal receiving apparatus capable of receiving a paging signal such that a transmission code system, such as a selected paging signal system, is previously defined in a transmitter of a mobile communication system, and thus a plurality of signals are continuously and repeatedly transmitted. The present invention is also directed to a method for receiving this selected paging signal.

2. Description of the Related Art

Known selected paging signal systems are arranged to couple a first code indicating transmission with a series of plural codes whose format has been designated. The series of codes whose format has been designated is constructed of a second code to be synchronized with the receiver apparatus, and also a third code containing an address code, message information, and a check code.

FIG. 2 depicts this signal system. One typical signal system is so called as a "POCSAG signal system".

To save battery power consumption, receiver apparatuses using this POCSAG signal system are operated intermittently to receive the signals. Then, various techniques for power saving have been proposed.

FIG. 2 indicates waiting conditions for the first code and operations after the first code is detected.

FIG. 2(a) and FIG. 2(b) show such operations of receiver apparatuses which correspond to the prior art disclosed in Japanese laid-open patent application No. 63-13432 (see FIG. 3) and one of the embodiments thereof (see FIG. 5). These prior art operations are rewritten in order to easily explain operations of the present invention. FIG. 4 is a schematic block diagram showing the arrangement of a prior art receiving apparatus operated as shown in FIG. 2(b).

A detailed description will now be made of FIG. 2. In accordance with the method of FIG. 2(a), the receiving circuit is turned ON every time a preselected time period has elapsed to carry out a detection operation for detecting the preamble (first code). When the preamble is detected (∇), the operation is advanced to the detection operation of the sync code SC (second code). Then, when the sync code SC is detected, the synchronization is established. Based upon this synchronization, the operation is advanced to the detection operation (4) of the subsequent sync code SC, and the detection operation (3) of the paging code (third code). However, as clearly explained in the above-described Japanese publication, when a series of signal groups have been completely transmitted and another series of signal groups has just arrived, this conventional system has the drawback that these newly arrived signal groups can not be captured. As to the completion by interrupting the signals of FIG. 2(a), when the sync code could not be detected one time, or more, the operation is again advanced to the intermittent operation for detecting a preamble (see upper portion in lower right column of page 2 of Japanese laid-open patent application No. 63-13432, and refer to "x" of FIG. 3(a)). In FIG. 2(b), the time to capture the preamble is set at each of timings when the sync code is received.

According to the method of FIG. 2(b), the detection operation of the sync code SC is omitted, and the sync condition is judged by utilizing the periodicity of the paging code. A higher battery power saving effect can be achieved, as compared with the method of FIG. 2(a). Furthermore, the detection operation of the preamble is newly provided between the two successive paging codes in order to detect the arrival of the new preamble.

When in accordance with this operation, the preamble is detected (∇) and subsequently the sync code SC is detected (○), the operation is advanced to the detection operation (3) of the paging code from this time instant. Subsequently, the detection operation (3') of the next paging code is carried out while using the paging code as the sync code.

FIG. 4 shows a circuit arrangement of the above-described receiving apparatus operated as defined in FIG. 2(b). Reception data inputted from the antenna is demodulated by the receiving means 21 and then the demodulated data is sent to the decoder 22. In decoder 22, the first to third codes are judged and detected from the demodulated data in accordance with the operation chart of FIG. 2(b). These detection results are supplied to timing controller 23, and then the switches 24 (switch S1) and 25 (switch S2) are turned ON/OFF based on a predetermined timer value, so that the receiving operation is carried out.

In accordance with the above-mentioned conventional method of FIG. 2a, the major aim is directed to the battery power saving aspect, but does not make use of any novel concept after a signal group series has been detected. In the conventional method of FIG. 2b, the detection operation for the preamble is newly performed at the reception timing of the sync code, and the specific ON time is employed in the receiving apparatus. To emphasize the battery power saving, this ON time is selected to have a minimum value sufficient to capture the preamble.

As described above, the major objects of the prior art systems are to reduce the power consumption of the batteries as much as possible. When the transmission operation for a series of signal groups is interrupted due to the occurrence of interference, the signal reception is once stopped. Then the information is again read after waiting for the subsequently transmitted preamble (first code). Otherwise, such an operation for intermittently capturing the preamble signal is inserted. This signal capturing time is minimized as much as possible to thereby prevent lowering of the battery power saving efficiency.

SUMMARY OF THE INVENTION

The present invention has an object to provide a simple signal receiving method and an apparatus manufactured at low cost, capable of quickly returning to a signal receiving condition even when an interference condition temporarily occurs during signal reception and this interference condition disappears while maintaining a function to suppress battery power consumption.

Another object of the present invention is to provide such signal receiving method and apparatus capable of simultaneously detecting both a sync code and a preamble in order that even when a data group series has newly arrived, the data group can be immediately received.

It should be noted that an "interference condition" mentioned in herein implies a condition under which reception can not occur caused by the following reasons. That is, when a receiving apparatus enters into a tunnel or a region behind a tall building along a signal propagation direction, or when a high power transceiver transmits a signal very close to this signal receiving apparatus, the interference condition will occur.

To achieve the above-described objects, the below-mentioned receiving method and apparatus are employed in accordance with the present invention.

(1) A method for receiving a selected paging signal in a receiving unit composed of a sync signal generating means for intermittently outputting a sync signal in a repetition period of the second code irrelevant to detection operations of the respective codes is characterized in that:

(i) every time the sync signal of said sync signal generating means is received, said receiving unit is operated only for a constant time in order that said receiving unit enters into detection operations of said first code and said second code;

(ii) when said first code is detected, said sync signal generating means is reset to continue the operation defined by (i);

(iii) when the second code is detected, said receiving unit is operated only for a predetermined time period after the detection of said second code, so that said receiving unit enters into the detection operation of said third code;

(iv) when said second code cannot be detected, the operation of the receiving unit is returned to the above explained operations defined by (i) to (iii) after said operation defined by (iii); and (v) when said predetermined third code is detected by the detection operation defined by (iii), information thereof is displayed.

(2) A method for receiving a selected paging signal is characterized in that said first code is a preamble, said second code is a sync signal, and said third code is a paging signal.

(3) A method for receiving a selected paging signal is characterized in that said transmission signal code system is a POCSAG signal system.

(4) A method for receiving a selected paging signal is characterized in that said constant time of said operation (i) is a time interval of said second code, and said predetermined time of said operation (iii) is a time interval corresponding to a time position to which said third code is allocated.

(5) A receiving apparatus for receiving a selected paging signal is characterized by comprising:

a receiving means 2 for receiving said transmission signal; a first code detecting means 3 for inputting therein the output from said receiving means 2; a second code detecting means 4; a third code detecting means 5; a sync signal generating means 6 for continuously generating a repetition signal having the same time period as that of said second code of said transmission signal; a first timing generating means 7 for generating a signal having a time width for detecting said second code in synchronism with the output from said sync signal generating means; a second timing generating means 8 for generating a signal having a time width for detecting the third code in synchronism with the output from said sync signal generating means when an output instruction signal is received from said second code detecting means 4; a switch means 9 for turning ON the operation of said receiving means 2 during the signal generating periods of said first timing generating means 7 and said second timing generating means 8; and a display means 11 for displaying the output from said third code detecting means 5, wherein:

said first code detecting means 3 outputs a reset signal to said sync signal generating means 6 when said first code is detected; said second code detecting means 4 performs the detection operation of said second code during the signal generation period of said first timing generating means 7, sends the output instruction signal to said second timing generating means 8 when said second code is detected, and also sends the output stop signal thereto when said second code is not detected; and said third code detecting means 5 performs the detection operation of said third code during the output period of said second timing generating means 8.

(6) A selected paging signal receiving apparatus is characterized in that said first code is a preamble, said second code is a sync signal, and said third code is a paging signal.

(7) A selected paging signal receiving apparatus is characterized in that said transmission signal code system is a POCSAG signal system.

(8) A selected paging signal receiving apparatus is characterized in that the time width of the signal generated from said first timing generating means 7 is a time interval of said second code, and the time width of the signal generated from said second timing generating means 8 is a time interval corresponding to a time position from the second code previously allocated to said third code.

As previously described, the receiving apparatus of the present invention includes a sync signal generator for generating the sync signal in the repetition period of the second code. The first code detecting means and the second code detecting means are operated by using this sync signal. Every time the first code is detected by the first code detecting means, the sync signal generator is reset. As a result, since the sync condition of the receiving apparatus with such a simple structure can be maintained even when the signal transmission is interrupted, this receiving apparatus can respond to any source of interference, and complete signal transmission. In other words, even when the interference temporarily happens to occur, the receiving apparatus can immediately recover the signal reception after this interference disappears. Also, since the intermittent operation is maintained, effective battery power saving can be achieved, as compared with that of the prior art receiving apparatus.

BRIEF DESCRIPTION OF THE DRAWINGS

For a better understanding of the present invention, a detailed description of the present invention will be presented below in conjunction with the accompanying drawings, in which:

FIGS. 3, 3(a)–3(c) diagram signal receiving operations of the receiving apparatus indicated in FIG. 1 when an interference condition occurs in comparison with the prior art.

DESCRIPTION OF THE PREFERRED EMBODIMENTS

Figure 1:
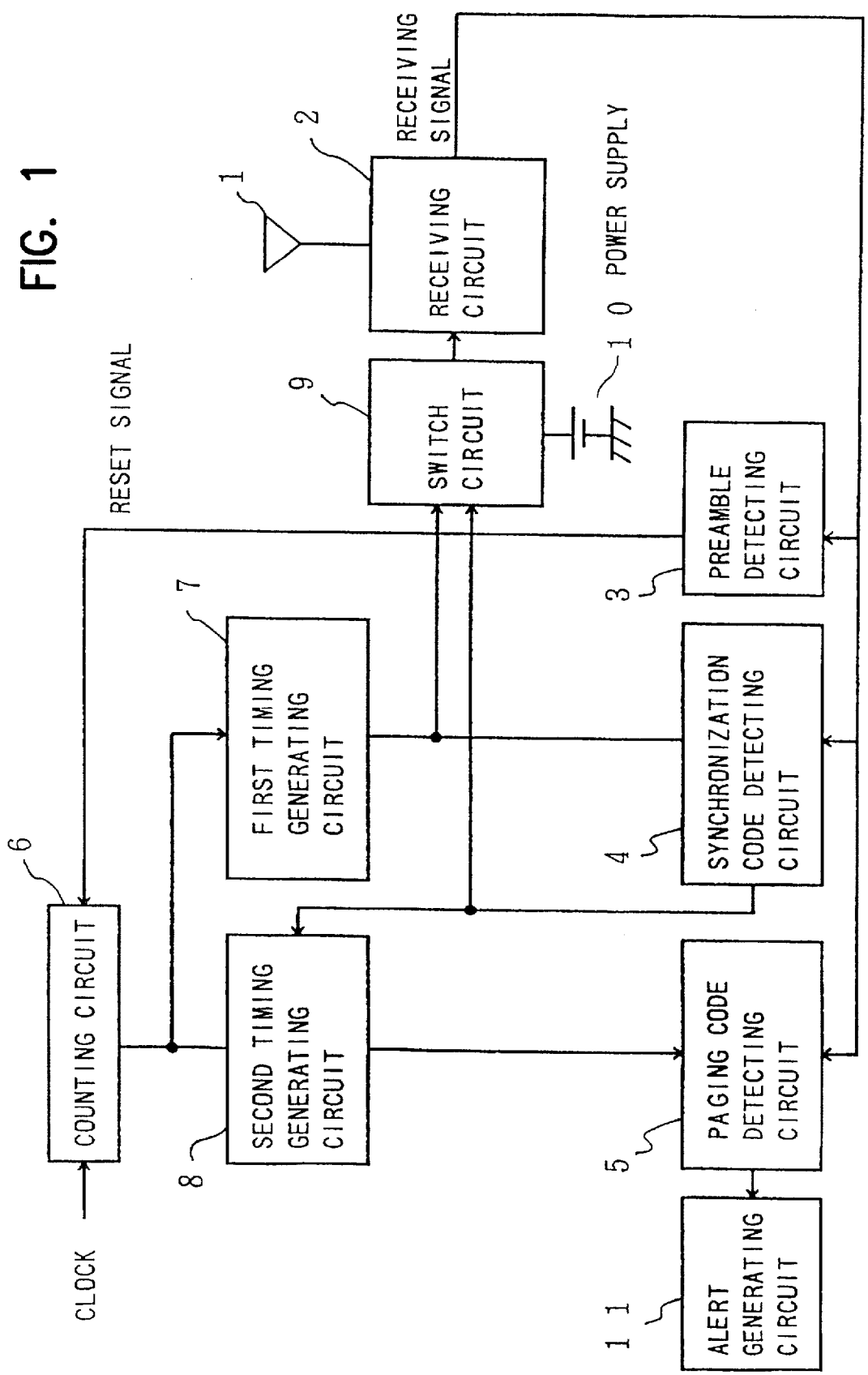
FIG. 1 schematically shows a circuit arrangement of a receiving apparatus according to an embodiment of the present invention.

FIG. 1 shows a circuit arrangement of a signal receiving apparatus operated in the POCSAG signal system, to which an embodiment of the present invention is applied. FIGS. 2(a) and (b) show conventional receiving operations and FIG. 2(c) shows a receiving operation according to the present invention under normal conditions. FIGS. 3(a) and (b) show conventional receiving operations and FIG. 3(c) shows a receiving operation according to the present invention when an interference condition happens to occur. An advantage of the present invention is clearly reflected in FIGS. 3.

Figure 2:
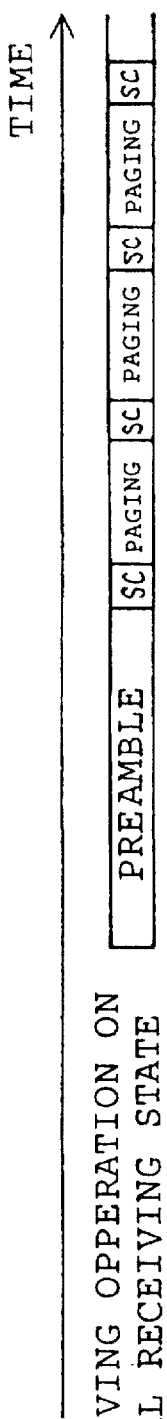
FIGS. 2 and 2(a)–2(c) diagram signal receiving operations of the receiving apparatus shown in FIG. 1 in comparison with the prior art.
Figure 2A:
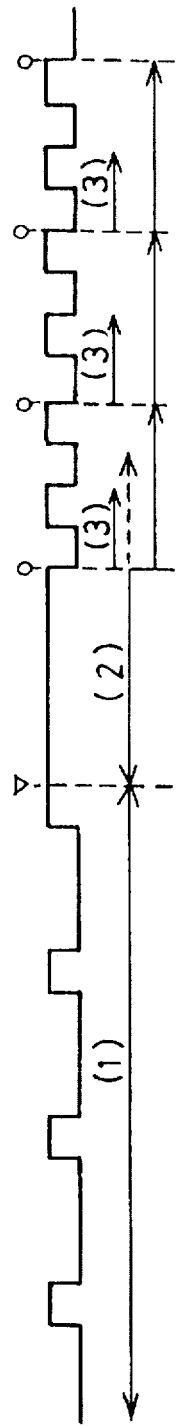

As previously described, a POCSAG signal is constituted by a preamble (first code) located at a head portion, and more than one batch, or packet, subsequent to the preamble (see FIG. 2). Each batch is composed of a sync code SC (second code), and a paging code (third code). In this example, one batch is constructed of 544 bits (equal to the time period of the sync code). The sync code SC is composed of 32 bits, and the paging code subsequent to this sync code SC is similarly constructed of 32 bits. The paging code is allocated to 224 to 287 bits from the end of the sync code.

In FIG. 1, an antenna 1 for receiving the POCSAG signal is connected to a receiving circuit 2 (corresponding to a receiving means). The signal received by this receiving circuit 2 is sent to a preamble detecting circuit 3 (corresponding to a first code detecting means), a sync (synchronization) code detecting circuit 4 (corresponding to a second code detecting means), and a paging code detecting circuit 5 (corresponding to a third code detecting means).

Preamble detecting circuit 3 detects a preamble in the received signal and produces a reset signal which is sent to a counting circuit 6 (corresponding to a sync signal generating means) when the preamble is detected.

Sync code detecting circuit 4 detects whether or not the sync code SC is present in the received signal. When the sync code SC is detected, this sync code detecting circuit 4 supplies an output instruction signal to a second timing generating circuit, or means, 8. When the sync code SC is not detected, this sync code detecting circuit 4 supplies an output stop signal to the second timing generating circuit 8.

Paging code detecting circuit 5 detects a desired paging code (third code) in the received signal upon receipt of an output from the second timing generating circuit 8.

Counting circuit 6 supplies a counted value (sync signal) to first timing generating circuit, or means, 7 and second timing generating circuit 8. The counted value is set to the same time period as that of the sync code, and is selected to be 544 bits in this case. The counting circuit 6 outputs the counted value every time clocks, or clock pulses, 0 to 543 are counted. The counting circuit 6 is reset in response to a reset signal produced when the first code detecting circuit 3 detects a preamble.

First timing generating circuit 7 performs the functions of defining the operation time duration of the second, or sync, code detecting circuit 4, and producing a time signal corresponding to the time duration period of the sync code. In this case, since the length of the sync code is 32 bits, the first timing generating circuit 7 generates such a time signal for counting bits 0 to 31 (32 bits) upon receipt of the output from the counting circuit 6. This output will constitute an ON signal for a switch circuit 9 and is also sent to the second code detecting circuit 4.

Second timing generating circuit 8 performs the function of defining the operation period of the paging code detecting circuit 5. This operation period is a defined time period after the sync code has been detected, when the position of the allocated paging code is detected.

In this case, the output period corresponds to a time period defined by 224th bit to 287th bit (64 bit-period) after the sync code has been detected. Upon receipt of the output instruction signal from the sync code detecting circuit 4, this output becomes an ON signal of the switch circuit 9 and also is sent to the paging code detecting circuit 5. Upon receipt of an output stop signal from circuit 4, no output signal is produced. As a consequence, no ON signal is supplied to the switch circuit 9, but also neither the receiving circuit 2 nor the paging code detecting circuit 5 is operated. Switch circuit 9 is provided to turn on an operation power supply 10 for the receiving circuit 2 only during the output periods of the first timing generating circuit 7 and the second timing generating circuit 8.

An alert generating circuit (display means) 11 displays information detected by the paging code detecting circuit 5. Circuit 11 may be constructed to include a speaker, a buzzer, or a liquid crystal display, etc.

Operation of receiving apparatus according to above-described embodiment of the present invention will now be explained, in comparison with the prior art, based on the signal diagrams shown in FIGS. 2.

Figure 2B:
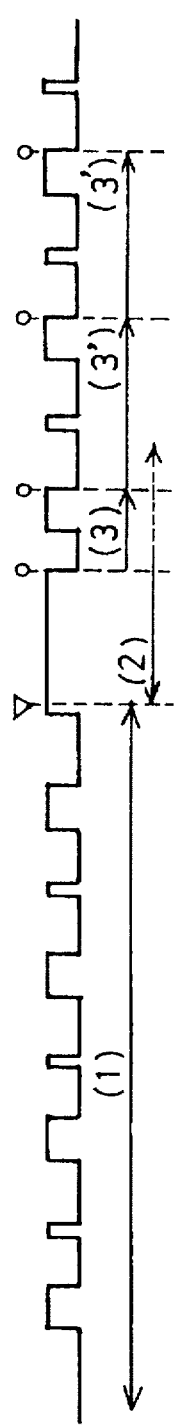
Figure 2C:
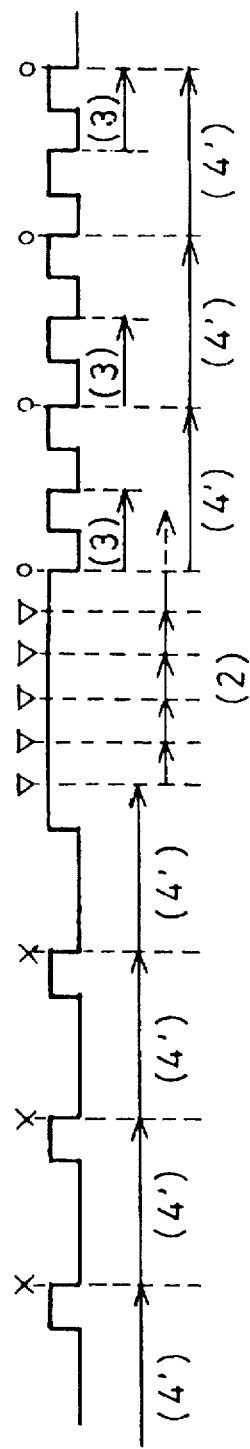
Figure 4:
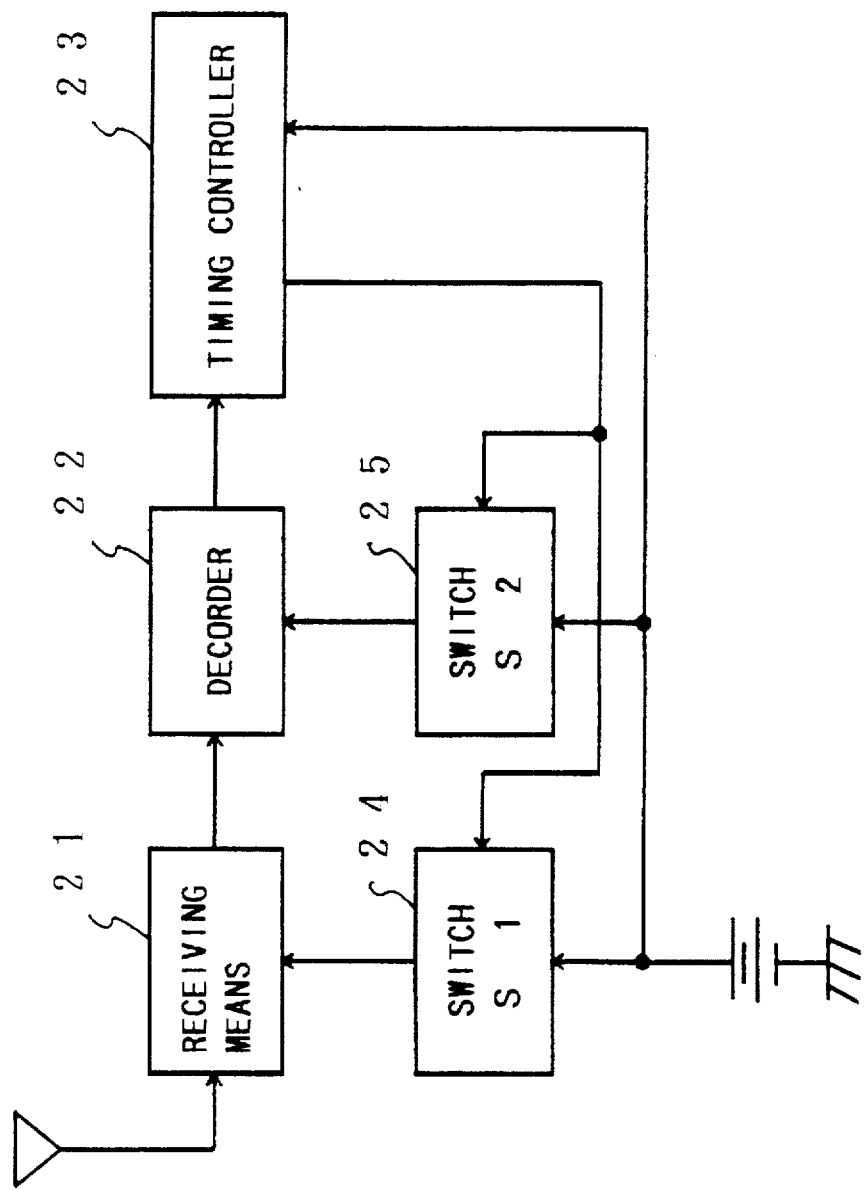
FIG. 4 schematically shows a circuit arrangement of the conventional receiving apparatus.

FIG. 2(a) represents the prior art described in Japanese Laid-open patent application No. 63-13432. FIG. 2(b) corresponds to one of the embodiments of the invention disclosed in Japanese laid-open patent application No. 63-13432, and FIG. 2(c) represents the present invention.

In this operation chart, symbol "x" denotes either a preamble, or a time instant when the sync code could not be detected. Symbol "○" represents a time instant when the synchronization can be established. Symbol "∇" shows a time instant when preamble is detected. Each time period denoted (1) is a time period during which the receiving circuit is intermittently operated so as to detect the preamble. Each time period denoted (2) is a time period during which, after a preamble has been detected, the sync code is detected while power supply 11 of receiving circuit 10 is turned ON. This time period (2) is set to be slightly longer than the length of the preamble and the length of the sync code. Each time period denoted (3) is a time period during which, after a sync code has been detected, the paging code is detected. Each time period denoted (3') is a time period during which, after one paging code has been detected, the next paging code is detected. Each time period denoted (4), which appears in FIGS. 3, is a time period during which, after one sync code has been detected, the subsequent sync code is detected. Also, each time period denoted (4') is a time period during which the preamble detecting operation is further carried out.

Under the condition that no POCSAG signal is being transmitted, as represented during (1), the prior art FIG. 2(a), FIG. 2(b) and the present invention FIG. 2(c) operate in the same manner. That is, the receiving circuit is intermittently turned ON every time a constant time period has elapsed, and a preamble waiting operation is performed. However, in FIG. 2(b), as previously described, a detection operation for the sync code SC is omitted, and the sync condition is judged by utilizing the periodicity of the paging code. The preamble is detected by additionally providing the preamble detecting operation between the two successive paging codes. As a consequence, the receiving apparatus executes the sync condition detecting operation also while the preamble is searched.

As previously explained, the counting circuit 6 is such a circuit set to output a sync (synchronization) signal with the same time period (namely, duration of 544 bits) as that of the sync code. Every time this sync signal is produced, the first timing generating circuit 7 is operated, and the output signal of this first timing generating circuit 7 is supplied to the switch circuit 9 so that the receiving circuit 2 is operable during this time period of 0 bit to 31 bits. The output signal of this first timing generating circuit 7 is a pulse signal having the same length as that of sync code, or a duration of 0 to 31 bits. The output signal derived from the receiving circuit 2 is supplied to the first code detecting circuit 3 which waits for the arrival of the preamble. The output signal from the first timing generating circuit 7 is also entered into the second code detecting circuit 4. This second code detecting circuit 4 is operated at the same timing as that of the first code detecting circuit 3, and simultaneously performs the detecting operation of the sync code.

When the first code detecting circuit 3 detects a preamble, this first code detecting circuit 3 sends a reset signal to the counting circuit 6 so as to reset this counting circuit 6. Subsequently, in response to an output derived from the counting circuit 6 after it has been reset, the first timing generating circuit 7 is operated to produce the timing signal. In response to this timing signal, the switch circuit 9, the preamble detecting circuit 3, and the sync code detecting circuit 4 are operated. Subsequently, this operation is repeatedly performed until the sync code detecting circuit 4 detects the sync code (symbol ▽).

When the sync code detecting circuit 4 detects the sync code (symbol ○), an output instruction signal is sent to the second timing generating circuit 8. As explained before, the second timing generating circuit 8 generates a signal having such a time period (time period from 224 bits to 287 bits) in synchronism with the counted output value of the counting circuit 6. This time period is defined to be from the time when detection of the sync code is completed until the paging code is detected. Upon receipt of an output instruction signal issued from the sync code detecting circuit 4, the second timing generating circuit 8 generates a timing signal. This output timing signal is entered into the switch circuit 9 and the paging code detecting circuit 5, so that both the receiving circuit 2 and the paging code detecting circuit 5 are brought into operating condition. As a consequence, upon receipt of a transmission signal, the receiving circuit 2 furnishes the received signal to the paging code detecting circuit 5. When the paging code detecting circuit 5 detects the own paging code assigned to the receiving circuit within this time period, an alert signal is generated by alert signal generating circuit 11. It should be noted that no timing signal is generated from the second timing generating circuit 8 during a time period (0 to 223 bits) from the sync code detection up to the allocated time period, and after the end of the paging code period.

Thereafter, since the time period (554 bits) of the next sync code is reached, the counting circuit 6 outputs a sync signal. The first timing generating circuit 7 outputs the timing signal during a time period corresponding to the timing duration of the sync code. Subsequently, while the sync code is detected, the above-described operation is repeated.

On the other hand, in FIG. 2(a), every time the sync code is detected, the detecting operations of the paging code (3) and the next sync code (4) are continued based on this detection timing.

In FIG. 2(b), the sync code is detected. Furthermore, when the sync code is detected (3), the detection operation of the sync code is canceled and the detection operation (3') of only the paging code is continued. Since the sync code detecting operation is stopped, the battery power saving operation can be achieved. It should be noted that the preamble detecting operation is inserted in between the two paging codes.

Referring now to FIG. 3, a description will be given of the operations when interference happens to occur during signal reception and the signal reception is temporarily interrupted in the prior art (FIGS. 3 (a) and (b)) and according to the present invention (FIG. 3 (c)).

Normally, even when a series of signals have been transmitted in the POCSAG signal system, no code used to indicate the completion of the signal transmission is sent. Accordingly, as indicated in FIG. 3(a), while detecting either the sync code, or the paging code, the preamble is not detected (x), so that when the signal transmission is interrupted, there is no means to judge whether this signal transmission is interrupted because of the occurrence of interference, or because of completion of the transmission of a series of signals. Therefore, if the synchronization condition is maintained for a long time, then there is such a drawback that a series of newly transmitted signals could not be received when a series of previously transmitted signals have been ended. As a consequence, the operation condition is advanced to an asynchronous condition, and the detection operation of the preamble is newly commenced just after this transition. In FIG. 3(b), the time duration to detect the preamble is limited to the minimum value so as to solve this drawback, and thus the detectors are intermittently operated at the same timing as that of the sync code.

In accordance with the present invention (FIG. 3 (c)), when the second code detecting circuit 4 can not detect the sync code during the signal reception, this second code detecting circuit 4 sends an output stop signal to the second timing generating circuit 8 in order not to output the second timing signal. As a result, both of the receiving circuit 2 and the paging code detecting circuit 5 are brought into inoperative conditions. However, there is no adverse influence on the counting operation of the counting circuit 6, and while the synchronization condition is maintained, the operation thereof is continued. Therefore, the first timing generating circuit 7 is continuously operated by receiving the counted output signal from the counting circuit 6, so that the receiving circuit 2, the preamble detecting circuit 3, and the sync code detecting circuit 4 are also operated. As a result, while keeping the synchronization condition with the transmission signal being reception, the receiving apparatus of the present invention can immediately respond to arrival of a new preamble, and also can quickly recover from a subsequent occurrence of interference.

In FIG. 3(a), when the sync code can not be detected (x), the sync code detecting operation is again carried out. Even if the sync code can not be detected (subsequent x), then it is assumed that the transmission of a series of signals is ended, and thus the detection operation of the preamble is newly entered. In FIG. 3(b), when the paging code can not be detected (x), if the interference condition ends, then the receiving apparatus can be again brought into the signal reception condition. Since the preamble detecting operation is inserted in between the successive paging codes, the preamble detecting operation can be immediately commenced in the case that the signal transmission is ended. It should be noted that since the battery power saving operation is emphasized in FIG. 3(b), after the sync signal has been detected, this detecting operation is stopped, and the timing of the paging code is utilized as the sync signal. As a result, also when the receiving apparatus is entered into the preamble detecting operation, the receiving apparatus maintains such a synchronization condition that the paging code is used as the timing in addition to the preamble detecting operation. As a consequence, when the preamble is detected, the battery power saving operation could not be effectively performed similar to FIG. 3(a).

To the contrary, according to the present invention (FIG. 3 (c)), since the counted output signal from the counting circuit (sync signal generating means) 6 reset by the preamble detecting circuit 3 is commonly used as the reference time signal supplied to the first timing generating circuit 7 and the second timing generating circuit 8, the circuit arrangement of the receiving apparatus thereof can be simplified and can be manufactured at reduced cost. Moreover, the receiving apparatus can respond to the synchronization condition after recovering from an interference event, and also can respond to the synchronization condition of the newly transmitted signals. When the preamble is searched, the battery power saving operation can be effected similar to FIG. 3(a).

When the quantity of information to be transmitted would be increased, a large number of batches subsequent to the preamble would be employed. As a result, the transmission time for transmitting a series of signals would be prolonged and there are trends that when the signal transmission is interrupted due to the interference, the frequency is increased. Furthermore. It would always be desirable to lower the manufacturing cost of the receiving apparatus. As previously explained, in accordance with the present invention, it is possible to realize the receiving method as well as the receiving apparatus at low cost, capable of immediately responding to temporal interference and the completion of signal transmission while maintaining the function of power saving.

In accordance with the present invention, the second code detecting operation is simultaneously performed with the first code detecting operation. The sync signal outputted from the sync signal generating means which is preset every time the first code is detected is commonly used as the reference time signal for the second code detecting operation and the third code detecting operation. Therefore, while maintaining the battery power saving function, the arrangement of the receiving apparatus can be made simple and at low cost. Even when the signal reception is temporarily interrupted, since there is no adverse influence to the normal signal receiving operation, if the communication condition could be recovered, then the signal reception can be immediately continued, so that this receiving apparatus can effectively respond to the occurrence of interference. Moreover, even when the signal transmission is interrupted by completing the transmission of a series of signals, if a series of signal groups have newly arrived, then this receiving apparatus can immediately and advantageously respond to the new signal arrivals.

This application relates to subject matter disclosed in Japanese Application number 7-045890, filed on Mar. 6, 1995, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A method for receiving a paging signal, composed of a first code, and a plurality of code series, the first code being a preamble which occurs prior to the plurality of code series, each code series including a second code constituting a sync code and a third code intermittently received by a receiving unit, the receiving unit being composed of a sync signal generating means for intermittently outputting a sync signal in a repetition period of the second code independent of detection operations of the respective codes, said method comprising:

(i) every time the sync signal of said sync signal generating means is produced, operating said receiving unit only for a constant time to enable said receiving unit to detect said first code and said second code;

(ii) in response to detection of a first code, resetting said sync signal generating means to repeat step (i);

(iii) in response to detection of the second code operating said receiving unit only for a predetermined time period after the detection of said second code, and causing said receiving unit to enter into a detection operation for said third code;

(iv) in response to failure to detect said second code after step (iii), repeating steps (i), (ii) and (iii); and (v) in response to detection of said third code in step (iii), displaying information contained in said third code.

2. A method for receiving a selected paging signal as claimed in claim 1 wherein:

said first code is a preamble, said second code is a sync signal, and said third code is a paging signal.

3. A method for receiving a selected paging signal as claimed in claim 2 wherein:

said paging signal is a POCSAG signal.

4. A method for receiving a selected paging signal as claimed in claim 3 wherein:

said constant time of said step (i) is a time interval of said second code, and said predetermined time of said step (iii) is a time interval corresponding to a time position to which said third code is allocated.

5. A method for receiving a selected paging signal as claimed in claim 2 wherein:

said constant time of said step (i) is a time interval of said second code, and said predetermined time of said step (iii) is a time interval corresponding to a time position to which said third code is allocated.

6. A method for receiving a selected paging signal as claimed in claim 1 wherein:

said paging signal is a POCSAG signal.

7. A method for receiving a selected paging signal as claimed in claim 6 wherein:

said constant time of said step (i) is a time interval of said second code, and said predetermined time of said step (iii) is a time interval corresponding to a time position to which said third code is allocated.

8. A method for receiving a selected paging signal as claimed in claim 1 wherein:

said constant time of said step (i) is a time interval of said second code, and said predetermined time of said step (iii) is a time interval corresponding to a time position to which said third code is allocated.

9. An apparatus for receiving a selected paging signal, the paging signal being a code system composed of a first code followed by a plurality of code series which are periodically continued, each code series being composed of a second code for constituting a sync code and a third code which is intermittently received by a receiving unit, and a preselected form of the third code is selectively received, said apparatus comprising:

a receiving means (2) for receiving the selected paging signal; a first code detecting means (3) for receiving the paging signal from said receiving means (2); a second code detecting means (4); a third code detecting means (5); a sync signal generating means (6) for continuously generating a repetition signal having the same time period as that of said second code of the paging signal; a first timing generating means (7) for generating a signal having a time width for detecting the second code in synchronism with the output from said sync signal generating means; a second timing generating means (8) for generating a signal having a time width for detecting the third code in synchronism with the output from said sync signal generating means (6) when an output instruction signal is received from said second code detecting means (4); a switch means (9) for supplying operating power to said receiving means (2) during time periods when said first timing generating means (7) and said second timing generating means (8) are generating a signal; and a display means (11) for displaying the output from said third code detecting means (5), wherein:

said first code detecting means (3) outputs a reset signal to said sync signal generating means (6) when the first code is detected; said second code detecting means (4) performs the detection operation of the second code during the signal generation period of said first timing generating means (7), sends the output instruction signal to said second timing generating means (8) when the second code is detected, and also sends an output stop signal to said second timing generating means (8) when the second code is not detected; and said third code detecting means (5) performs the detection operation of the third code during the signal generation period of said second timing generating means (8).

10. An apparatus for receiving a selected paging signal as claimed in claim 9 wherein:

the first code is a preamble, the second code is a sync signal, and the third code is a paging signal.

11. An apparatus for receiving a selected paging signal as claimed in claim 10 wherein:

the paging signal code system is a POCSAG signal system.

12. An apparatus for receiving a selected paging signal as claimed in claim 11 wherein:

the time width of the signal generated by said first timing generating means (7) is a time interval of the second code, and the time width of the signal generated by said second timing generating means (8) is a time interval corresponding to a time position from the second code previously allocated to the third code.

13. An apparatus for receiving a selected paging signal as claimed in claim 10 wherein:

the time width of the signal generated by said first timing generating means (7) is a time interval of the second code, and the time width of the signal generated by said second timing generating means (8) is a time interval corresponding to a time position from the second code previously allocated to the third code.

14. An apparatus for receiving a selected paging signal as claimed in claim 9 wherein:

the paging signal code system is a POCSAG signal system.

15. An apparatus for receiving a selected paging signal as claimed in claim 14 wherein:

the time width of the signal generated by said first timing generating means (7) is a time interval of the second code, and the time width of the signal generated by said second timing generating means (8) is a time interval corresponding to a time position from the second code previously allocated to the third code.

16. An apparatus for receiving a selected paging signal as claimed in claim 9 wherein:

the time width of the signal generated by said first timing generating means (7) is a time interval of the second code, and the time width of the signal generated by said second timing generating means (8) is a time interval corresponding to a time position from the second code previously allocated to the third code.

* * * * *

UNITED STATES PATENT AND TRADEMARK OFFICE
CERTIFICATE OF CORRECTION

PATENT NO. : 5,760,699
DATED : June 2, 1998
INVENTOR(S) : Yoshiaki Saka, Shinichi Idomukai, Isamu Fujii, and Yuji Hishiki It is certified that error appears in the above-identified patent and that said Letters Patent is hereby corrected as shown below:

On the title page, item [30] FOREIGN APPLICATION PRIORITY DATA is omitted. It should read -- Japan 7-045890 filed March 6, 1995--.

Signed and Sealed this

Eighteenth Day of August, 1998

Attest:

BRUCE LEHMAN

*Attesting Officer*  *Commissioner of Patents and Trademarks*